(12) United States Patent
Sizelove

(10) Patent No.: US 7,634,994 B2
(45) Date of Patent: Dec. 22, 2009

(54) HIGH EFFICIENCY TUBE MAT SOLAR COLLECTOR HAVING INTERMITTENTLY SEPARATED TUBES AND METHOD FOR PREVENTING DAMAGE TO A SOLAR COLLECTOR

(75) Inventor: J. David Sizelove, Brick, NJ (US)

(73) Assignee: Aquatherm Industries, Inc., Lakewood, NJ (US)

( * ) Notice: Subject to any disclaimer, the term of this patent is extended or adjusted under 35 U.S.C. 154(b) by 612 days.

(21) Appl. No.: 11/221,930

(22) Filed: Sep. 9, 2005

(65) Prior Publication Data

US 2006/0048771 A1    Mar. 9, 2006

Related U.S. Application Data

(60) Provisional application No. 60/608,152, filed on Sep. 9, 2004, provisional application No. 60/657,400, filed on Mar. 2, 2005.

(51) Int. Cl.
*F24J 2/24* (2006.01)
(52) U.S. Cl. .................. 126/651; 126/663; 126/672
(58) Field of Classification Search ............. 126/651, 126/663, 670, 672, 634
See application file for complete search history.

(56) References Cited

U.S. PATENT DOCUMENTS 4,353,352 A * 10/1982 Zinn ..................... 126/626

* cited by examiner

*Primary Examiner*—Alfred Basichas
(74) *Attorney, Agent, or Firm*—James C. Lydon

(57) ABSTRACT

A solar collector including a plurality of hollow tubes, each tube directly joined, or indirectly joined by a web, to an adjacent tube; a first manifold connected to a first end of each tube; a second manifold connected to a second end of each tube; where at least two adjacent tubes are separated along a portion of their length so as to form a first section in which adjacent tubes are separated from one another and a second segment in which adjacent tubes are joined to one another. Also disclosed is a method for preventing damage to a tube mat solar collector which includes maintaining the hollow tubes of a solar collector in a substantially coplanar relationship in the absence of high wind conditions; permitting individual tubes to move about their longitudinal axis in response to high wind conditions; and returning the tubes to their longitudinal axis as the high wind conditions subside, the high wind conditions being wind of at least 15 miles per hour.

24 Claims, 6 Drawing Sheets

HIGH EFFICIENCY TUBE MAT SOLAR COLLECTOR HAVING INTERMITTENTLY SEPARATED TUBES AND METHOD FOR PREVENTING DAMAGE TO A SOLAR COLLECTOR

This application claims the benefit of U.S. provisional patent application No. 60/608,152, filed Sep. 9, 2004 and U.S. provisional patent application No. 60/657,400, filed Mar. 2, 2005.

BACKGROUND OF THE INVENTION

The present invention relates to an improved solar collector having a tube construction in which the tubes of the solar collector are intermittently separated along their length.

An important application of solar collectors is as part of a heating system for swimming pools. Most conventional low temperature pool heating solar collectors have an all-plastic construction which includes an extruded plastic absorber section containing hollow tubes connected to hollow manifolds on opposed absorber section ends. These absorber sections are conventionally either of tube mat or loose tube form. Tube mat collectors maintain uniform tube spacing either due to webs or spacers between adjacent hollow tubes or because adjacent tubes are connected directly to one another. Loose tube collectors require a plurality of spacer bars or clips intermittently positioned along their length to maintain tube spacing. Tube mat collectors provide a superior aesthetic and energy collection performance over loose tube collectors.

Solar collectors for swimming pool heating systems are typically mounted in an elevated location such as on top of a house roof. Such locations require the solar collector to be continuously exposed to the elements, and thus the solar collector must be sufficiently durable to withstand severe weather conditions, including wind, rain and hail.

Conventional loose tube collectors allow wind to freely pass through their very open absorber sections. This type of solar energy collector suffers from reduced solar energy collection capability in comparison to tube mat solar energy collectors due to the free and uninhibited passage of air around their absorber tube surfaces, which causes thermal energy loss due to convective cooling of the hollow tubes. Moreover, their energy collection capability proportionately worsens with increasing wind speed.

Conventional tube mat collectors have a 95-100% closed absorber section. The amount of air flow around the hollow tubes is minimized, and thus reduces convective heat loss.

Conventional tube mat solar energy collectors typically have a 4 foot width and a length of from 6 to 20 feet. A disadvantage of this closed absorbed section is the effect high winds can have on the solar collector, which can act as a sail. More particularly, high winds can exert very high force on the solar energy absorber, which force is transmitted to attachment hardware such as lag screws which secure the solar collector to the roof. Winds of sufficiently high velocity, for example, 15 miles per hour or above, can damage and even remove or otherwise destroy roof-mounted tube mat solar collectors. The industry has sought to overcome the problem of wind damage by using more mounting hardware than required by loose tube collectors. However, the use of additional mounting hardware increases the cost of material and labor, and requires an undesirable increase in the number of penetrations into a homeowner's roof.

An object of the present invention is to retain the superior solar energy collecting performance and aesthetic appeal of a tube mat solar collector in the most frequently encountered operating circumstances of low to moderate winds, while providing a lifting force reduction when acted upon by high winds.

A feature of the present invention is the presence of alternating separated and non-separated segments in a tube mat solar collector.

An advantage of the present invention is a reduction in lifting force exerted upon the mounting means securing the solar collector to its mounting location during periods of high velocity wind.

SUMMARY OF THE INVENTION

In one aspect, the present invention relates to a solar collector comprising
 a plurality of hollow tubes, each tube being directly joined to an adjacent tube;
 a first manifold connected to a first end of each tube;
 a second manifold connected to a second end of each tube;
 wherein at least two adjacent tubes are separated from one another along a portion of their length so as to form a first tube section in which adjacent tubes are separated from one another and a second tube segment in which adjacent tubes are directly joined to one another.

In a second aspect, the present invention relates to a solar collector comprising
 a plurality of hollow tubes, each tube joined to an adjacent tube by a web;
 a first manifold connected to a first end of each tube;
 a second manifold connected to a second end of each tube;
 wherein at least one web comprises a plurality of first web segments having a slit running in the same direction as the tubes, said first web segments being separated from one another by a second web segment which does not have a slit.

In a third aspect, the present invention is directed to a method for preventing damage to a tube mat solar collector, comprising
 maintaining a plurality of hollow tubes of a solar collector in a substantially coplanar relationship in the absence of high wind conditions by directly joining adjacent tubes to one another or indirectly joining adjacent tubes to one another by a web;
 permitting portions of individual tubes to move about their longitudinal axis in response to high wind conditions exerted thereon; and
 returning said portions of individual tubes to their longitudinal axis as the high wind conditions subside, said high wind conditions comprising wind having a velocity of at least 15 miles per hour.

BRIEF DESCRIPTION OF THE DRAWINGS

The present invention will be understood and appreciated more fully from the following detailed description taken in conjunction with the attached drawings in which.

DETAILED DESCRIPTION OF THE PREFERRED EMBODIMENTS

Figure 1:
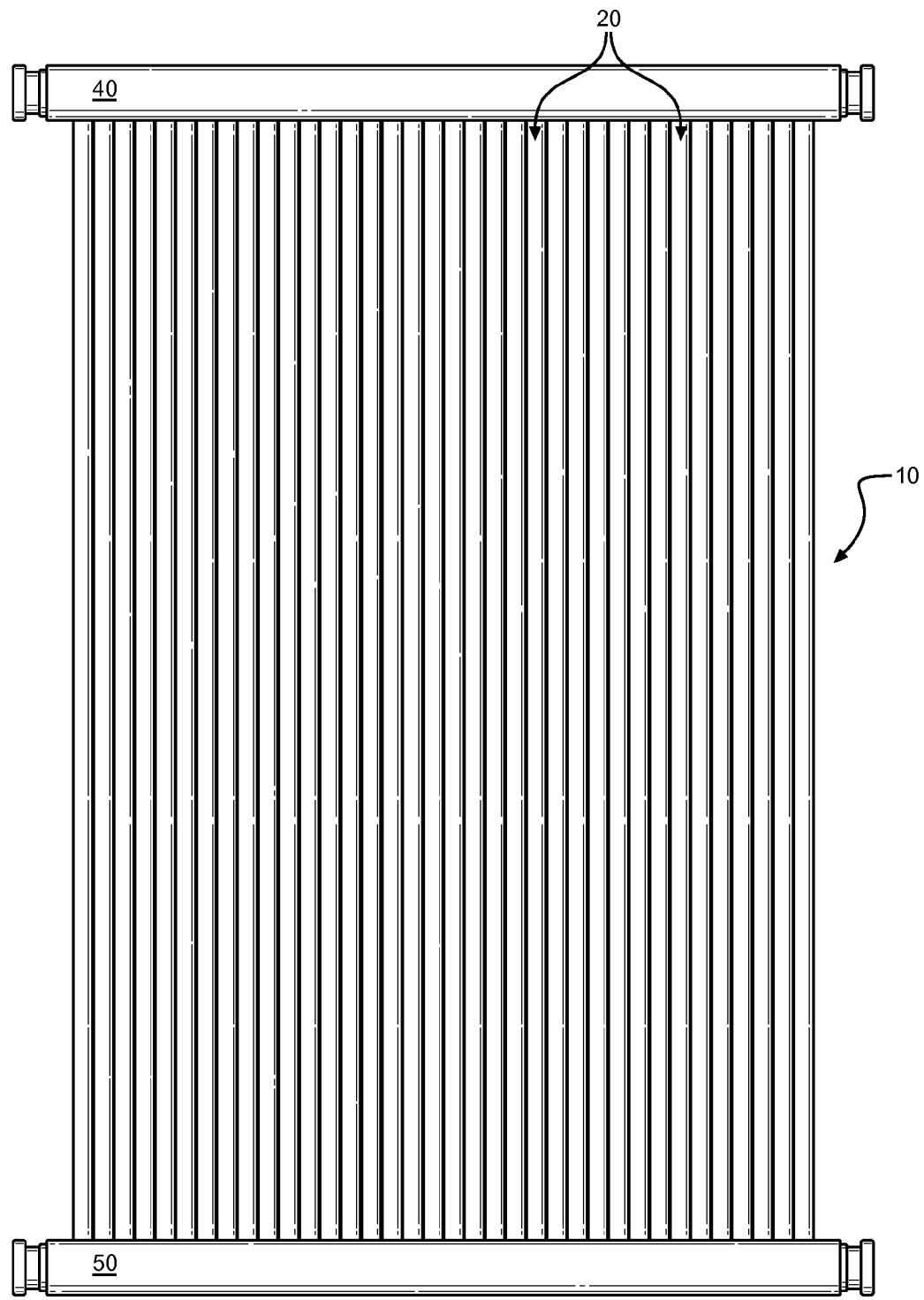
FIG. 1 is a plan view of a first embodiment of a solar collector of the present invention.
Figure 2:
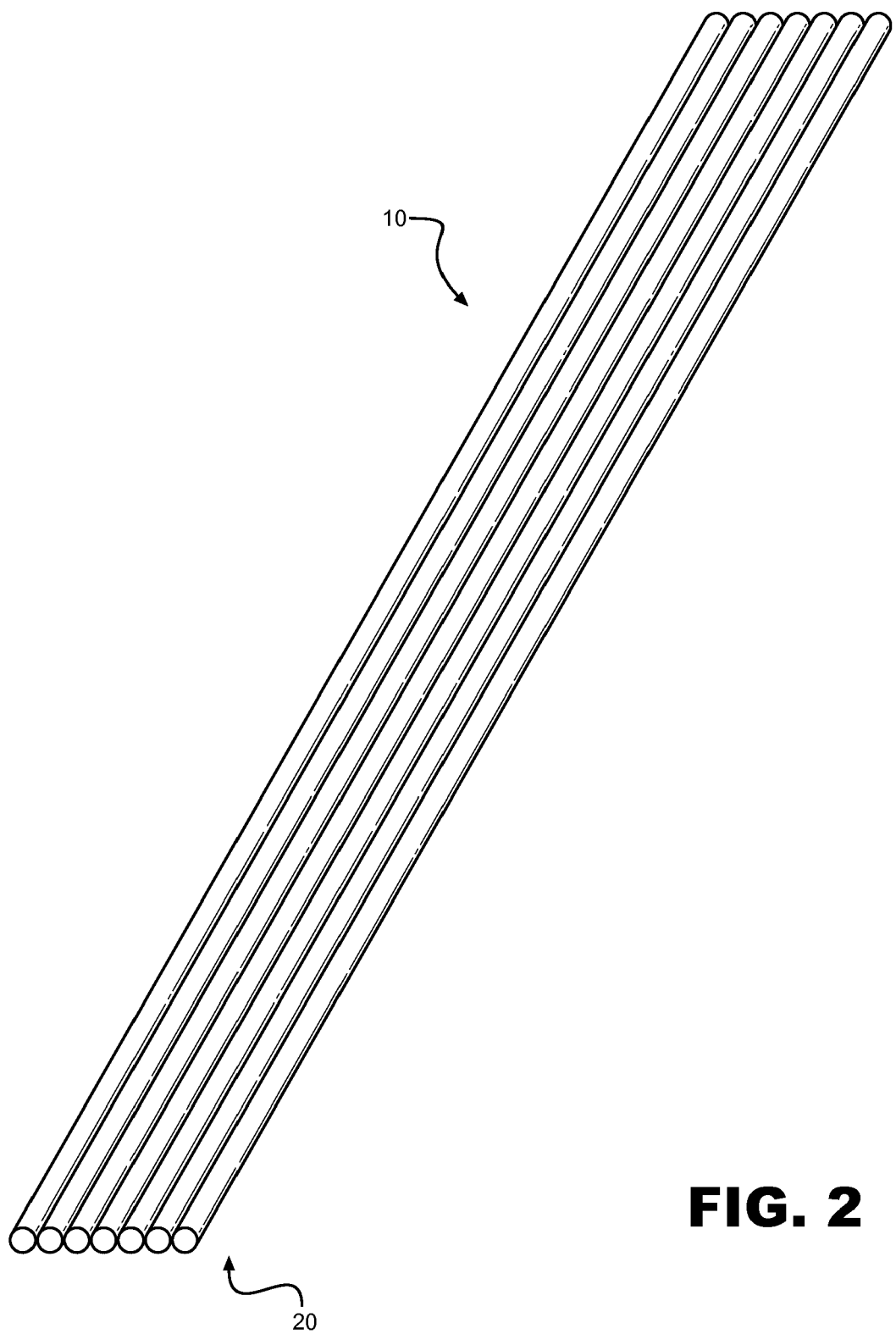
FIG. 2 is a plan view of the tube mat of the solar collector shown in FIG. 1 in the absence of wind.
Figure 3:
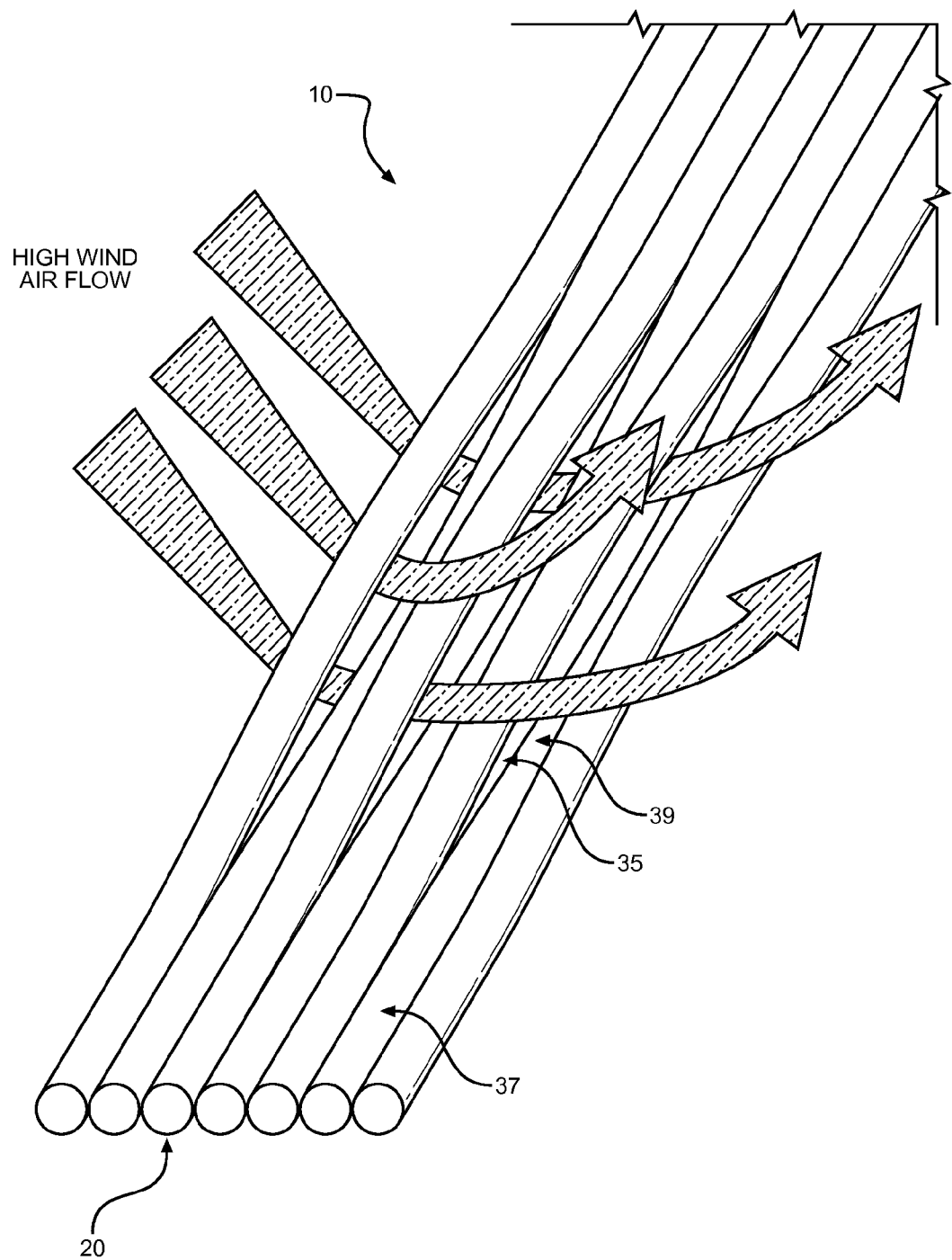
FIG. 3 is a plan view of a portion of the tube mat shown in FIG. 2 during a period of high wind.

A first preferred embodiment of the solar collector of the present invention is shown in FIGS. 1-3. Tube mat 10 comprises a plurality of hollow tubes 20, with each tube 20 directly joined to an adjacent tube. By "directly joined to an adjacent tube" it is meant there is no web or other spacer material between adjacent tubes. First manifold 40 is connected to a first end of each hollow tube 20, while second manifold 50 is connected to a second end of each hollow tube 20.

Referring to FIG. 2, adjacent tubes 20 are separated from one another along a portion of their length. The longitudinal separation has a length sufficient to permit individual tubes to move about their major axis in both the horizontal and vertical directions under high wind conditions. The width of the separation is sufficiently thin that the separation is difficult to visually observe from the ground under low to moderate wind conditions, when the solar collector is conventionally mounted on a residential roof.

The non-separated tube segments impart high efficiency solar energy collection to the solar collector. More particularly, the non-separated tube segments serve to minimize airflow around the hollow tubes, and thus minimize heat loss due to convective cooling. The non-separated tube segments also maintain the pleasing aesthetic appearance of the tube mat itself. A non-separated tube segment length from ¼ inch to 12 inches in length is preferred, with a length of from ¼ to 6 inches even, more preferred.

Each separated tube segment of the tube mat is preferably sufficiently long to permit individual tubes to move about their major axis in both the horizontal and vertical directions under high wind conditions. A separated segment length ranging from 6 inches to 48 inches in length is preferred, with a slit length of 18 to 23¾ inches even more preferred.

As best shown in FIG. 3, the distance between adjacent tubes in a separated tube segment 39—the width 35 of the separation—is variable depending on wind conditions. During periods of low to moderate wind, the tube separation is minimal, and the adjacent tubes may abut.

The minimal width of tube separation is important to maintain solar energy collection efficiency and also for aesthetic reasons. During the most frequently encountered weather conditions of low to moderate wind, minimal width of the adjacent tube separation serves to minimize air flow around the hollow tubes, and thus minimize convective heat loss therefrom, because little air moves from one side of the tube mat to the other through the separated tube segments. Moreover, a casual observer may not even notice the separated tube segments during such weather conditions.

As depicted in FIG. 3, the separated tube segments 39 permit a degree of individual tube movement about the major tube axis in both its vertical and horizontal directions during high wind conditions. As the individual tubes 20 move in response to wind, air can efficiently pass from one side of the tube mat to the other, and thus minimize the force of the wind on the solar collector and its mounting hardware. The degree of tube movement is dependent on wind velocity. As the force exerted by winds of increasing speed increases, hollow tubes 20 have the freedom to progressively spread more and more open, and progressively bleed off the excessive force imposed on the solar collector mounting hardware. As the wind subsides, the individual tubes return to their original configuration under the influence of non-separated tube segments 37.

This high wind lift force reduction enables a reduction in mounting hardware, and thus roof penetrations, required for the solar collector of the present invention. Indeed, the number of roof penetrations may approach the minimal number required for loose tube solar collectors.

The proportionality of each length of the separated tube segments 35 compared to each length of the non-separated tube segments 37 determines the extent to which the lifting force exerted by high winds is reduced, and the extent to which the individual tubes retain the aesthetically desirable mat like appearance when viewed from the ground. The solar collector's ability to withstand high wind forces increases as the total area of its separated tube segments 39 increases and its non-separated tube segments 37 decreases. Conversely, the solar collector's tendency to retain a mat like appearance is increased as the total area of the non-separated tube segments increases and the separated tube segments decreases.

Tube mats for solar collectors are typically made from a thermoplastic such as polyolefin, for example propylene homopolymer or ethylene/propylene copolymer. The thermoplastic may be continuously extruded using conventional equipment and techniques into a plurality of hollow tubes, each tube being directly joined to an adjacent tube. This tube mat may then be cut into a desired length.

Each separated tube segment 39 is formed by separating adjacent tubes, for example by slitting. It is preferred that little or no tube material is removed from the tubes by the separation procedure in order to both minimize convective cooling loss, to avoid damage to hollow tubes, and to maintain the aesthetic look of the tube mat solar collector during periods of low to moderate wind conditions.

By "little or no removal of tube material" it is meant that separating adjacent tubes removes little or no tube material which is visible to the unaided human eye.

Figure 4:
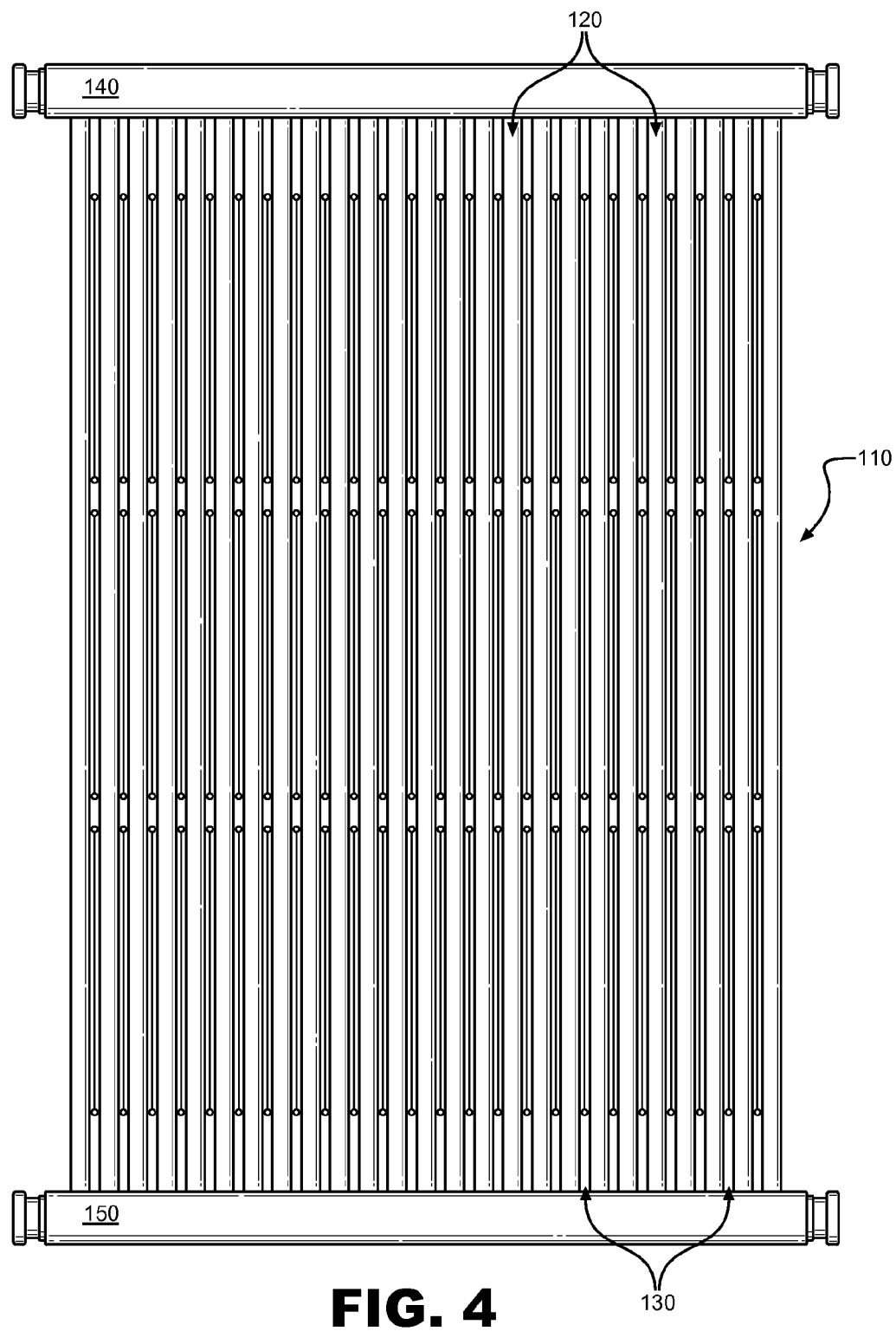
FIG. 4 is a plan view of a second embodiment of the solar collector of the present invention.
Figure 5:
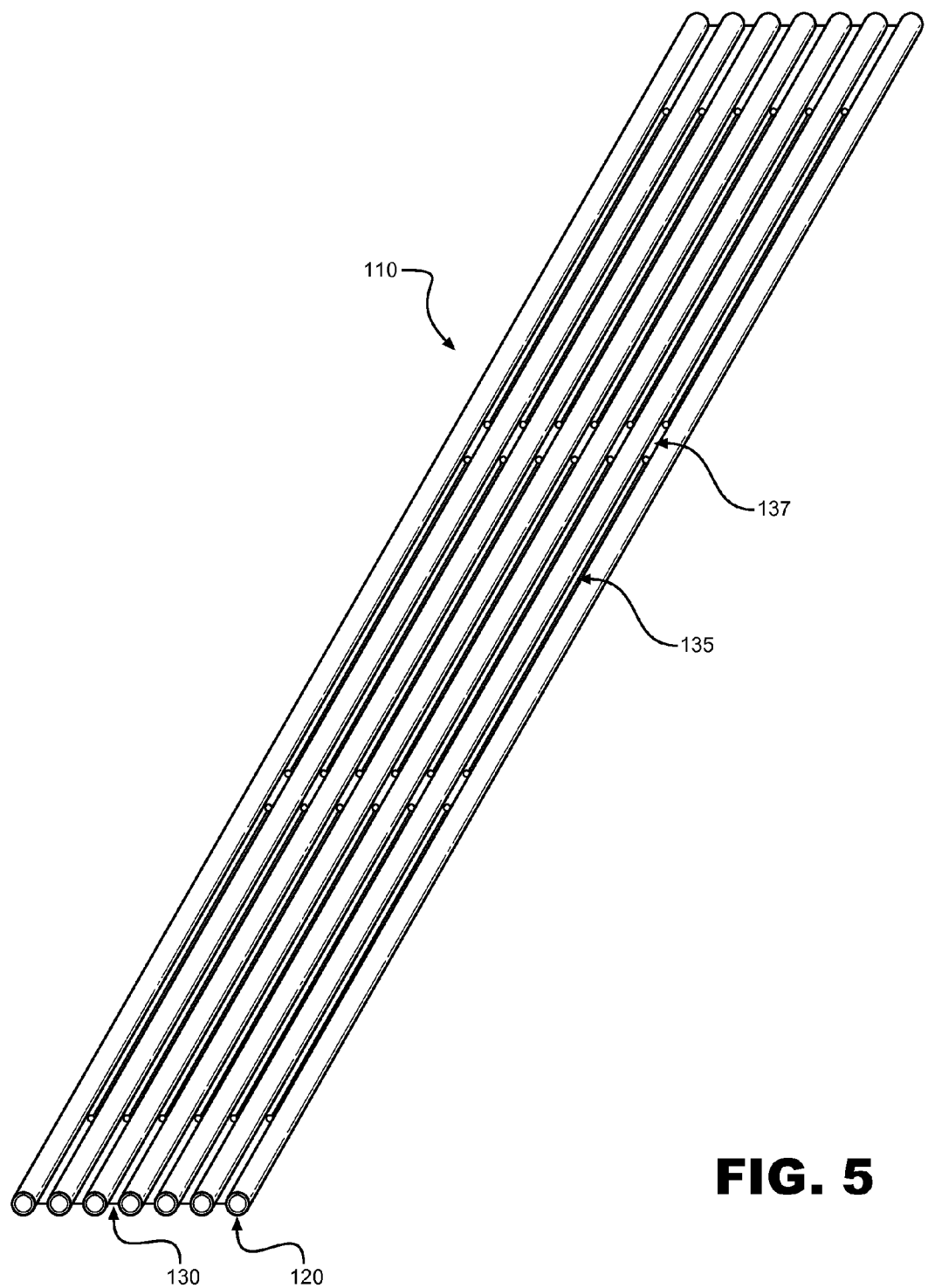
FIG. 5 is a plan view of the tube mat of the solar collector shown in FIG. 4 in the absence of wind.
Figure 6:
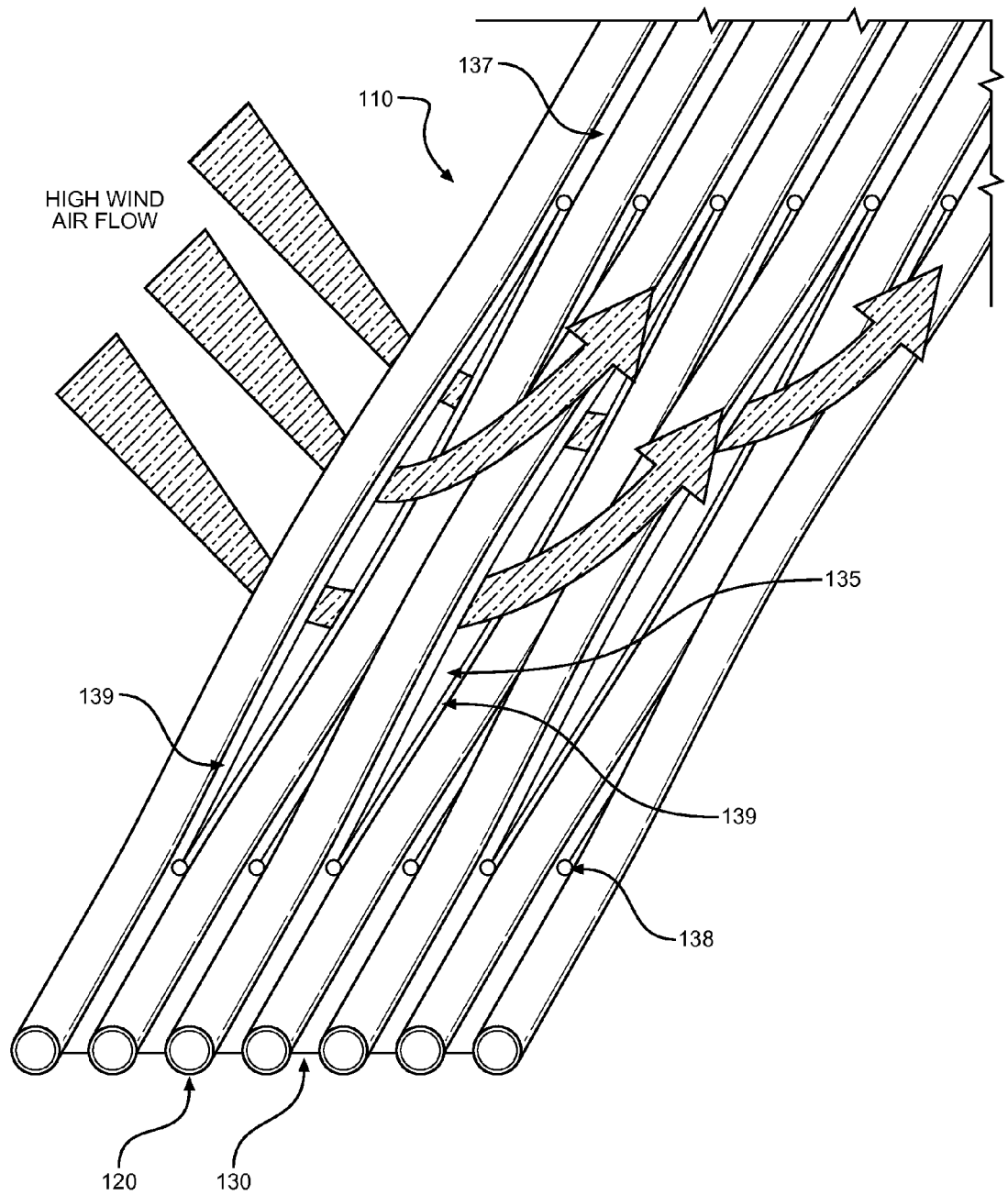
FIG. 6 is a plan view of a portion of the tube mat shown in FIG. 5 during a period of high wind.

The tubes may preferably be separated between the extruder and the cutter. A conventional cutting apparatus, for example, a slitting knife or rotating blade, can be used to intermittently separate adjacent tubes and thus form the separated tube segments of the tube mat. Alternatively, separation of adjacent tubes may be achieved by intermittent operation of a device for joining adjacent tubes only at preselected locations. An infrared heat lamp is an example of a device for joining adjacent tubes. Xx A second preferred embodiment of the solar collector of the present invention is shown in FIGS. 4-6. Tube mat 110 comprises a plurality of hollow tubes 120, each tube 120 joined to an adjacent tube by a web 130. First manifold 140 is connected to a first end of each hollow tube 120, while second manifold 150 is connected to a second end of each hollow tube 120.

As shown more clearly in FIG. 5, webs 130 contain alternating slit web segment 135 and non-slit web segments 137. By "slit" it is meant a longitudinal separation in the web whose length is sufficient to permit individual tubes to move about their major axis in both the horizontal and vertical directions under high wind conditions, but whose width is sufficiently thin that the slit is difficult to visually observe from the ground under low to moderate wind conditions, when the solar collector is conventionally mounted on a residential roof. Each slit is oriented in a direction parallel with hollow tubes 120, and is preferably positioned at the approximate center of the webs which connect adjacent tubes 120.

The non-slit web segments of the webs impart high efficiency solar energy collection. More particularly, the non-slit webs serve to minimize airflow around the hollow tubes, and thus minimize heat loss due to convective cooling. The non-slit web segments also maintain the desired separation between adjacent hollow tubes, and thus the pleasing aesthetic appearance of the tube mat itself. A non-slit web segment length from ¼ inch to 12 inches in length is preferred, with a length of from ¼ to 6 inches even more preferred.

Each slit web segment of the web is preferably sufficiently long to permit individual tubes to move about their major axis in both the horizontal and vertical directions under high wind conditions. A slit length ranging from 6 inches to 48 inches in length is preferred, with a slit length of 18 to 23¾ inches even more preferred.

As best shown in FIG. 6, slitting of web 130 creates two opposed half-web sections 139 extending from adjacent tubes. The distance between these opposed half-web sections 139—the width the slit—is variable depending on wind conditions. During periods of low to moderate wind, the slit width is minimal, and the opposed half-web sections 139 may even abut.

The minimal width of the slit is important to maintain solar energy collection efficiency and also for aesthetic reasons. During the most frequently encountered weather conditions of low to moderate wind, the half-web sections 139 of the slit web segment serve to minimize air flow around the hollow tubes, and thus minimize convective heat loss therefrom, because little air moves from one side of the tube mat to the other through the slits. Moreover, a casual observer may not even notice the slits during such weather conditions.

As depicted in FIG. 6, the slits permit a degree of individual tube movement about the major tube axis in both its vertical and horizontal directions during high wind conditions. As the individual tubes 120 move in response to wind, opposed half-web sections 139 separate from one another, thereby permitting air to efficiently pass from one side of the tube mat to the other, and thus minimizing the force of the wind on the solar collector and its mounting hardware. The degree of tube movement is dependent on wind velocity. As the force exerted by winds of increasing speed increases, hollow tubes 120 have the freedom to progressively spread more and more open, and progressively bleed off the excessive force imposed on the solar collector mounting hardware. As the wind subsides, the individual tubes return to their original configuration under the influence of non-slit web segments 137. This high wind lift force reduction enables a reduction in mounting hardware, and thus roof penetrations, required for the solar collector of the present invention. Indeed, the number of roof penetrations may approach the minimal number required for loose tube solar collectors.

The proportionality of each length of the slit web segments 135 compared to each length of the non-slit web segments 137 determines the extent to which the lifting force exerted by high winds is reduced, and the extent to which the individual tubes retain the aesthetically desirable mat like appearance when viewed from the ground. The solar collector's ability to withstand high wind forces increases as the total area of its slit web segments 135 increases and its non-slit web segments 137 decreases. Conversely, the solar collector's tendency to retain a mat like appearance is increased the total area of the non-slit web segments increases and the slit web segments decreases.

In a preferred embodiment, both ends of each slit are provided with an anti-slit propagation hole 138 whose diameter is larger than the width of the slit in the absence of wind. Anti-slit propagation hole 138, which may be substantially circular or in the form of an oblong slot, provides improved tear resistance at the non-slit transition, and thus reduces the tendency for the slit to grow and eventually tear completely through the non-slit web segment under very high wind conditions. The anti-slit propagation holes may be either visible or not visible from the ground, since their number along the length of the collector is sufficiently small enough so as not to detract from the overall mat like appearance. Additionally, they provide an extremely negligible contribution to the overall wind lift reduction of the collector as well as an extremely negligible impact on its energy collection ability.

As discussed above in relation to the first embodiment of the invention, tube mats for solar collectors are typically made from a thermoplastic such as polyolefin, for example propylene homopolymer or ethylene/propylene copolymer. The thermoplastic may be continuously extruded using conventional equipment and techniques into the desired tube mat configuration, which may then be cut into a desired length.

Each slit is formed by separating the web, for example by slitting, into two opposed half-web segments. It is preferred that little or no web material is removed from the web by the separation procedure in order to both minimize convective cooling loss and to maintain the aesthetic look of the tube mat solar collector during periods of low to moderate wind conditions.

By "little or no removal of web material" it is meant that slitting of the web removes little or no web material which is visible to the unaided human eye.

The slits may preferably be formed in the webs of the tube mat sections between the extruder and the cutter. A conventional cutting apparatus, for example, a slitting knife or rotating blade, can be used to intermittently separate the web and thus form the slit web segments of the tube mat. Alternatively, a laser can be used to form the slit.

The cutting apparatus should be positioned so as to separate the web substantially in the middle of the web.

An anti-slit propagation hole 138 may be formed in the ends of the slits using conventional techniques and equipment such as a punch. Alternatively, a laser can be used to form the hole.

The solar energy collector of the present invention may be mounted on roofs and used to heat water using techniques and equipment well known to those of ordinary skill in this art.

The present invention provides mat-like absorber performance under conditions in which mat-type performance is more desirable, and loose tube-like absorber performance under conditions in which loose tube-like performance is more desirable.

The invention claimed is:

1. A solar collector comprising
    a plurality of hollow tubes, each tube being directly joined to an adjacent tube, such that there is no web or other spacer material between adjacent tubes;
    a first manifold connected to a first end of each tube;
    a second manifold connected to a second end of each tube;
    wherein at least two adjacent tubes are separated from one another along a portion of their length so as to form a first tube segment in which adjacent tubes are separated from one another and a second tube segment in which adjacent tubes are directly joined to one another, such that at least one first tube segment is separated from both the first and second manifolds by a second tube segment, such that air can move from one side of the solar collector to an opposite side of said solar collector through separated adjacent tubes.

2. The solar collector of claim 1, wherein said first tube segment has a length of from 6 inches to 48 inches.

3. The solar collector of claim 2, wherein the length of said first tube segment is from 18 to 23 ¾ inches.

4. The solar collector of claim 1, wherein said second tube segment has a length of from ¼ inch to 12 inches.

5. The solar collector of claim 4, wherein the length of said second tube segment is from ¼ to 6 inches.

6. A solar collector comprising
a plurality of hollow tubes, each tube joined to an adjacent tube by a web;
a first manifold connected to a first end of each tube;
a second manifold connected to a second end of each tube;
wherein at least one web comprises a plurality of first web segments having a slit running in the same direction as the tubes such that air can move from one side of the solar collector to an opposite side of said solar collector through said slit, said first web segments being separated from one another by a second web segment which does not have a slit, such that at least one first web segment is separated from both the first and second manifolds by another said second web segment.

7. The solar collector of claim 6, wherein said first web segment has a length of from 6 inches to 48 inches.

8. The solar collector of claim 7, wherein the length of said first web segment is from 18 to 23 ¾ inches.

9. The solar collector of claim 6, wherein said second web segment has a length of from ¼ inch to 12 inches.

10. The solar collector of claim 9, wherein the length of said second web segment is from ¼ to 6 inches.

11. The solar collector of claim 6, wherein each end of said first web segment has a hole of greater diameter that a width of said slit in the absence of wind.

12. A method for preventing damage to a solar collector, comprising
maintaining a plurality of hollow tubes of a solar collector in a substantially coplanar relationship in the absence of high wind conditions by directly joining adjacent tubes to one another such that there is no web or other spacer material between adjacent tubes or indirectly joining adjacent tubes to one another by a web,
wherein at least one web comprises a plurality of first web segments having a slit running in the same direction as the tubes, said first web segments being separated from one another by a second web segment which does not have a slit, such that at least one first web segment is separated from both the first and second manifolds by a second web segment;
permitting individual tubes of a tube mat solar collector to move about their longitudinal axis in response to high wind conditions exerted thereon; and
returning said individual tubes to their individual longitudinal axis as the high wind conditions subside, said high wind conditions comprising wind of at least 15 miles per hour.

13. The method of claim 12, wherein said individual tubes are directly joined to one another and said tubes permitted to move about their longitudinal axis by separating adjacent tubes from one another to produce a plurality of first tube segments, said first tube segments being separated from one another by a second tube segment in which adjacent tubes are directly joined to one another.

14. The method of claim 13, wherein said intermittent separation produces a separated tube segment having a length of from 6 inches to 48 inches and a non-separated tube segment having a length of from ¼ inch to 12 inches.

15. The method of claim 13, wherein said separation operation is performed by a knife or rotating blade.

16. The method of claim 13, wherein separation of adjacent tubes is achieved by intermittent operation of a device for joining adjacent tubes.

17. The method of claim 12, wherein substantially no material is removed from the tubes or webs during separation of adjacent tubes from one another.

18. The method of claim 12, wherein said individual tubes are indirectly joined to one another by a web, and said tubes are permitted to move about their longitudinal axis by intermittently slitting at least one web of a tube mat to produce a plurality of first web segments having a slit running in the same direction as the tubes, said first web segments being separated from one another by a second web segment which does not have a slit.

19. The method of claim 18, wherein said slit is made substantially in the middle of said web.

20. The method of claim 18, wherein said intermittent slitting produces a slit web segment having a length of from 6 inches to 48 inches and a non-slit web segment having a length of from ¼ inch to 12 inches.

21. The method of claim 18, further comprising
providing a hole at both ends of said slit, said hole having a greater diameter that a width of the slit.

22. The method of claim 18, wherein said slitting operation is performed by a knife or rotating blade.

23. The method of claim 18, wherein said slitting operation is performed by a laser.

24. The method of claim 18, wherein substantially no material is removed from the web during slitting.

* * * * *